United States Patent [19]
Patel

[11] Patent Number: 5,150,236
[45] Date of Patent: Sep. 22, 1992

[54] TUNABLE LIQUID CRYSTAL ETALON FILTER

[75] Inventor: Jayantilal S. Patel, Red Bank, N.J.

[73] Assignee: Bell Communications Research, Inc., Livingston, N.J.

[21] Appl. No.: 598,476

[22] Filed: Oct. 16, 1990

Related U.S. Application Data

[63] Continuation-in-part of Ser. No. 577,220, Aug. 31, 1990, Pat. No. 5,068,749.

[51] Int. Cl.$^5$ ............... G02F 1/1335; G02F 1/1337; G02F 1/137
[52] U.S. Cl. ........................ 359/71; 359/66; 359/78; 359/93; 359/94
[58] Field of Search ............... 350/347 V, 347 E, 346; 356/352; 359/42, 66, 71, 93, 94, 78

[56] References Cited

U.S. PATENT DOCUMENTS

| | | | |
|---|---|---|---|
| 4,630,898 | 12/1986 | Jewell | 350/393 |
| 4,779,959 | 10/1988 | Saunders | 350/346 |
| 4,790,634 | 12/1988 | Miller et al. | 350/347 V |
| 4,917,476 | 4/1990 | Makh et al. | 359/71 |

OTHER PUBLICATIONS

F. C. Saunders et al., "Novel optical cell design for liquid crystal devices providing sub-millisecond switching," *Optical and Quantum Electronics*, 1986, vol. 18, pp. 426–430.

J. S. Patel et al., "A reliable method of alignment for smectic liquid crystals," *Ferroelectrics*, 1984, vol. 59, pp. 137–144.

M. W. Maeda et al, "An Electronically Tunable Fiber Laser with a Liquid-Crystal Etalon Filter as the Wavelength-Tuning Element," Post Deadline Paper PD-4 on Optical Multiple Access Networks, Jul. 25–27, 1990, Monterey, Calif.

M. W. Maeda et al, "Novel Electrically Tunable Filter Based on a Liquid-Crystal Fabry-Perot Etalon for High-Density WDM Systems," *Proceedings of the 16th European Conference on Optical Communication*, Sep. 16–20, 1990, Amsterdam, The Netherlands, pp. 145–148.

*Primary Examiner*—Stanley D. Miller
*Assistant Examiner*—Anita Pellman Gross
*Attorney, Agent, or Firm*—Leonard Charles Suchyta; Charles S. Guenzer

[57] ABSTRACT

A tunable liquid-crystal etalon filter comprising two dielectric stack mirrors defining an optical cavity into which is filled a liquid crystal. Electrodes disposed on the outsides of the mirrors apply an electric field to the liquid crystal, changing its refractive index and thereby changing its optical length. Thereby, the optical pass band of the filter can be electrically changed in a low-powered, compact, rugged, and economical structure.

18 Claims, 2 Drawing Sheets

TUNABLE LIQUID CRYSTAL ETALON FILTER

RELATED APPLICATION

This application is a continuation-in-part of Ser. No. 07/577,220, filed Aug. 31, 1990, now issued as U.S. Pat. No. 5,068,749.

FIELD OF THE INVENTION

The invention relates generally to optical filters; in particular, it relates to liquid-crystal optical filters.

BACKGROUND ART

A need has arisen for low-cost, tunable optical filters. For example, one proposed architecture for the future telephone network based on optical fiber uses wavelength-division multiplexing (WDM). In WDM, the data of different communication channels (e.g., multiple voice channels, video channels, high-speed data channels) modulate optical carriers of different wavelength, and all the optical carriers are impressed upon a single optical fiber. The multiplexed optical signals are all distributed to many customer sites, each with its own receiver. Each receiver must be able to pick out one of the multiplexed signals. In a direct detection scheme, an optical filter passes only the selected optical carrier, and an optical detector detects the time-varying (data modulated) intensity of the filtered optical carrier. Preferably, this filter should be tunable so as to easily select different data channels. Channel spacings of as little as 1 nm are being proposed in the infra-red band of 1.3 to 1.5 $\mu$m.

Diffraction gratings provide the required resolution but are too expensive and fragile for customer-premise use. It is desired that the tunability be purely electrical and include no moving mechanical parts. Acousto-optic filters have been proposed. They offer superior resolution, tuning range, and ruggedness. However, their cost remain moderately high, and they require significant amounts of expensive RF electrical power.

A liquid-crystal light modulator has been disclosed by Saunders in U.S. Pat. No. 4,779,959 and by Saunders et al. in "Novel optical cell design for liquid crystal devices providing sub-millisecond switching," *Optical and Quantum Electronics*, volume 18, 1986, pages 426–430. A modulator blocks or passes the input light. A filter performs a more complicated function by frequency selecting from a broad input spectrum, passing some components while blocking others. Saunders defines a 10 $\mu$m optical cavity between two partially reflecting metallic mirrors and fills the cavity with a nematic liquid crystal. The mirrors also act as electrodes for the standard liquid-crystal display configuration in which an applied bias rearranges the liquid-crystal orientation. However, in the etalon configuration of Saunders, the applied bias in changing the effective refractive index of the liquid crystal also changes the resonance condition for the cavity. Both references include a graph showing a bias-dependent optical filtering. Saunders relies upon this effect to intensity modulate a beam of well defined frequency between two intensity values.

The liquid-crystal modulator of Saunders could be modified to be used as a tunable filter for a wide bandwidth signal. However, it would operate poorly. For a simple Fabry-Perot etalon, the transmission at a given wavelength $\lambda$ for radiation incident to the normal of the surface is given by $$T(\lambda) = \frac{\tau}{(1 - \rho)^2 + 4\rho\sin^2\delta} \qquad (1)$$

where $\delta = \phi + k_0 dn$. Here $\tau$ and $\rho$ are the transmittance and the reflectance and, $\phi$ is the phase shift experienced upon reflection, d is the thickness of the uniaxial material, n is the refractive index along the director axis, and $k_0$ is the magnitude of the wave-vector outside the layer. Equation (1) shows that the width of the transmission peak $\Delta\lambda$ depends essentially on the reflectivity of the surfaces, while the overall transmission is dictated by the absorption losses.

Saunders uses silver mirrors having reflectivities in the range of 85–90%. His illustrated transmissions peak at about 50%, an acceptable value for some applications, but the peaks are relatively wide. The widths present little problem when the structure is used as a modulator for a well defined wavelength. However, Saunder's peaks are separated by only a few times the peak widths. Therefore, his structure would be effective at filtering only a very few channels. For a practically useful device such as those useful in multichannel systems, the reflectivity of the mirrors must be kept above 95%. The peak width of Saunders could be reduced by increasing the thickness of the silver mirrors, thus increasing the mirror reflectivity to above 90%. However, the increased thickness would increase the mirror absorption losses to the point where the peak transmission is unacceptably lowered.

SUMMARY OF THE INVENTION

Accordingly, an object of the invention is to provide an electrically tunable optical filter that is inexpensive, rugged, and lowpowered.

Another object of the invention is to provide such a filter with narrow transmission peaks relative to the spacing between peaks.

The invention can be summarized as a liquid-crystal etalon optical filter in which the liquid crystal is sandwiched between two dielectric stack mirrors defining the optical cavity. Electrodes associated with each mirror apply a bias to the liquid crystal, thereby changing its dielectric characteristics and thus the resonance conditions of the optical cavity. Preferably, the electrodes are placed behind the mirrors, thus avoiding absorption loss. Variation of the bias applied to the electrodes causes the pass frequency of the filter to be electrically changed.

DETAILED DESCRIPTION OF THE PREFERRED EMBODIMENTS

The optical filter of the invention is a liquid-crystal etalon filter, in which the end mirrors of the optical cavity are highly reflective, preferably being dielectric interference mirrors.

Figure 1:
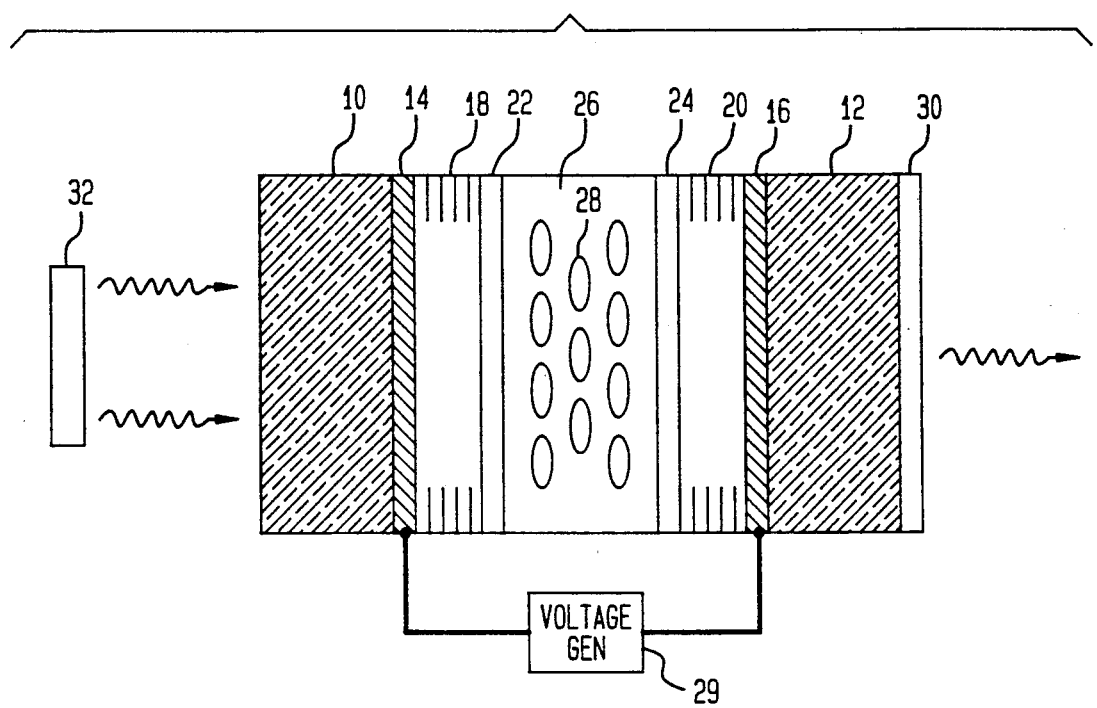
FIG. 1 is a cross-section of a first embodiment of the liquid-crystal etalon filter of the invention.

An embodiment of the invention is illustrated in cross-section in FIG. 1. Two glass plates 10 and 12 of 1.62 mm thick soda-lime glass are used as substrates. Transparent electrodes 14 and 16 of indium-tin-oxide are deposited on the substrates 10 and 12. Delectric stack mirrors 18 and 20 are formed on the electrodes 14 and 16. The mirrors 18 and 20 may be either commercially procured from Virgo Optics, Inc. of Port Richey, Florida, in which case they are juxtaposed to the existing structure. Alternatively, they may be deposited on the electrodes 14 and 16 by sputtering. The deposited mirrors 18 and 20 are designed for an infrared filter around 1.5 $\mu$m although we have fabricated others that have been centered around 0.3 $\mu$m and 1.9 $\mu$m. The mirrors we fabricated consisted of four pairs of quarter-wavelength thick layers of different refractive index, specifically $Al_2O_3$ (an insulator) and Si. For the 1.5 $\mu$m mirrors, the $Al_2O_3$ layers were ~240 nm thick and the Si layers were ~120 nm thick. The transmission curves of FIG. 2, to be described later, were fit to theoretical expressions including the reflectance of the mirrors. The so calculated mirror reflectance was ~98%, compared to the maximum reflectance of 90% for the modulator of Saunders. Thus, the system requirement of 95% is easily satisfied.

Dielectric mirrors of themselves are well known. For example, Kwon and Yoo disclose two interference mirrors defining the ends of an optical cavity for a surface-emitting semiconducting laser in U.S. Pat. No. 5,034,958. One of the mirrors consisted of alternating layers of Si and $Al_2O_3$, and the other consisted of alternating layers of semiconducting AlAs and GaAs.

Alignment layers 22 and 24 are formed on the dielectric stacks 18 and 20 by the procedure described by Patel et al. in "A reliable method of alignment for smectic liquid crystals", *Ferroelectrics*, volume 59, 1984, pages 137-144. The two assembled structures are then assembled with a precise gap between them according to the following method. Four UV curable epoxy dots were placed over the alignment layer 24 at the corners of one of the structures. The epoxy is previously mixed with 10 $\mu$m rod spacers available from EM Chemicals of Hawthorne, N.Y. The second structure is then placed on the first structure having the epoxy with the alignment directions of the two alignment layers 22 and 24 being parallel. Manual pressure is gently applied to the structures while observing optical interference patterns under monochromatic light. The interference fringes are minimized. This structure is captured by hardening the UV curable epoxy by exposing the structure to UV radiation. The assembled structure is heated to about 100° C. and a liquid crystal material 26 is flowed into the gap by capillary action. A nematic liquid crystal, E7, available from EM Chemicals, is used in its isotropic state. The gap is estimated to produce a Fabry-Perot cavity length of about 11 $\mu$m between the dielectric stacks 18 and 20. The alignment layers 22 and 24 cause liquid-crystal molecules 28 in the liquid-crystal material 26 to orient with their long axes parallel to the reflectors 18 and 20 and also one set of their short axes to orient parallel to the reflectors 18 and 20 but perpendicular to the long axes. These orientations apply only for no applied bias. In this embodiment, there is no significant twist of the liquid-crystal molecules from one reflector to the other.

Electrical leads are connected between the electrodes and a voltage generator 29. For our tests, the generator 29 was a computer-controlled programmable voltage source, such as, Wavetek Model 75, which produced a square wave at 1 kHz.

A sheet polarizer 30 can be formed on the outside of either glass substrate 10 or 12 with its polarization direction aligned with the long axes of the molecules 28. However, the filter used in our tests used either unpolarized light or external means for controlling the polarization. Furthermore, the filter can be designed to operate in a band of radiation that avoids the need of a polarizer.

Figure 2:
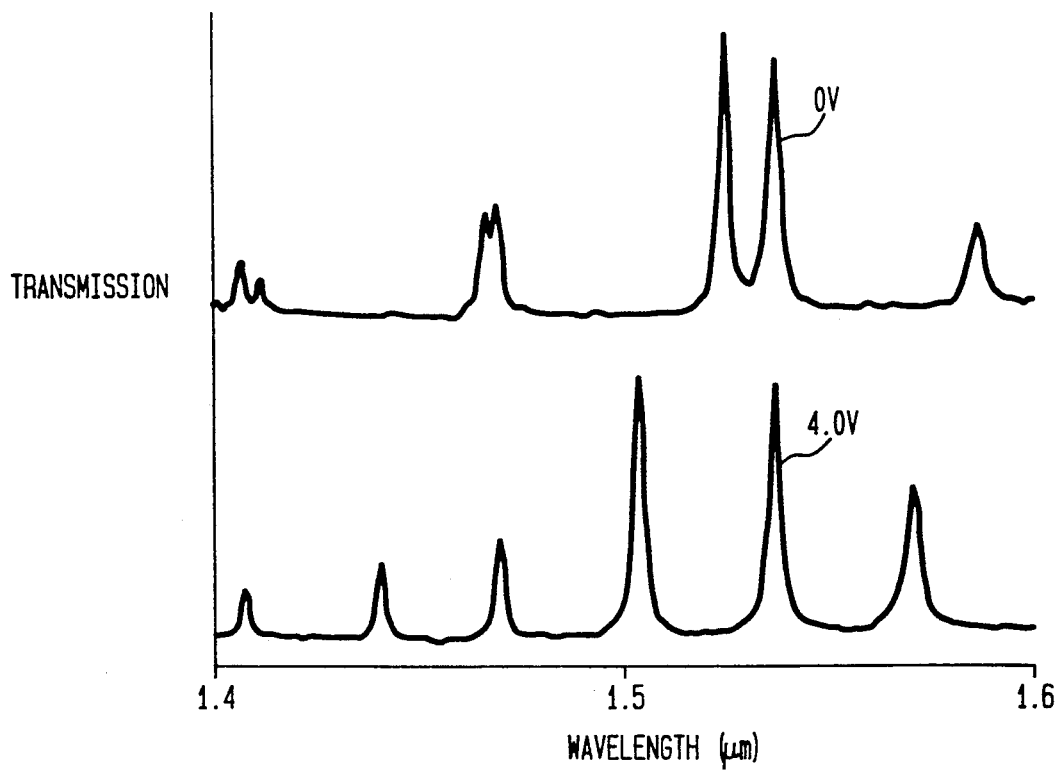
FIG. 2 is a graph illustrating the spectral dependence of transmission of the filter of FIG. 1 at two bias voltages.

A light-emitting diode producing light at 1.5 $\mu$m was used as a light source 32 to test the filter of the embodiment of FIG. 1. In an initial test, no polarizer was used and the transmission spectrum was measured for applied AC bias of 0 V and 4 V, as illustrated in the graphs of FIG. 2. The units of transmission are arbitrary and the baselines have been suppressed.

It is seen that some peaks shift with bias while others remain fairly stationary. By separate experiments, it has been demonstrated that the stationary peaks correspond to light polarized parallel to the short axes of the liquid-crystal molecules 28 and the tunable peaks correspond to light polarized parallel to the long axes. As a result, the filter can also be thought of as a narrow-band polarizer.

Because of the high reflectivity of the dielectric stacks 18 and 20, the width $\Delta\lambda$ of the transmission peaks is relatively small, ~1–2 nm, measured as a full width at half maximum. However, the free spectral range (FSR), which is the wavelength separation between successive transmission peaks, is relatively large, ~75 nm. It is determined by the optical thickness n.d of the etalon and by the spectral regions in which it is being operated. This range depends on the order in which the interferometer is being operated, and it is given by $$FSR = 2 \cdot n \cdot \frac{d}{m(m+1)} \quad (2)$$

where m is the order. The refractive index of liquid crystals is typically in the range of 1.5 to 1.7. Thus, 1.5 $\mu$m light will pass through the etalon having the 11 $\mu$m gap when the etalon is used in the 22-nd order. In this wavelength region, the free spectral range for a 11 $\mu$m etalon would be about 75 nm. The choice of using an 11 $\mu$m thickness was simply due to convenience of fabrication of the actual device. This thickness should ideally be chosen such that the wavelength range of interest is the same as the free spectral range. The tuning range is estimated to be order of 200 nm which corresponds to a change of about 0.2 in the refractive index. The maximum change in the index is equal to the birefringence of the uniaxial liquid crystal.

Figure 3:
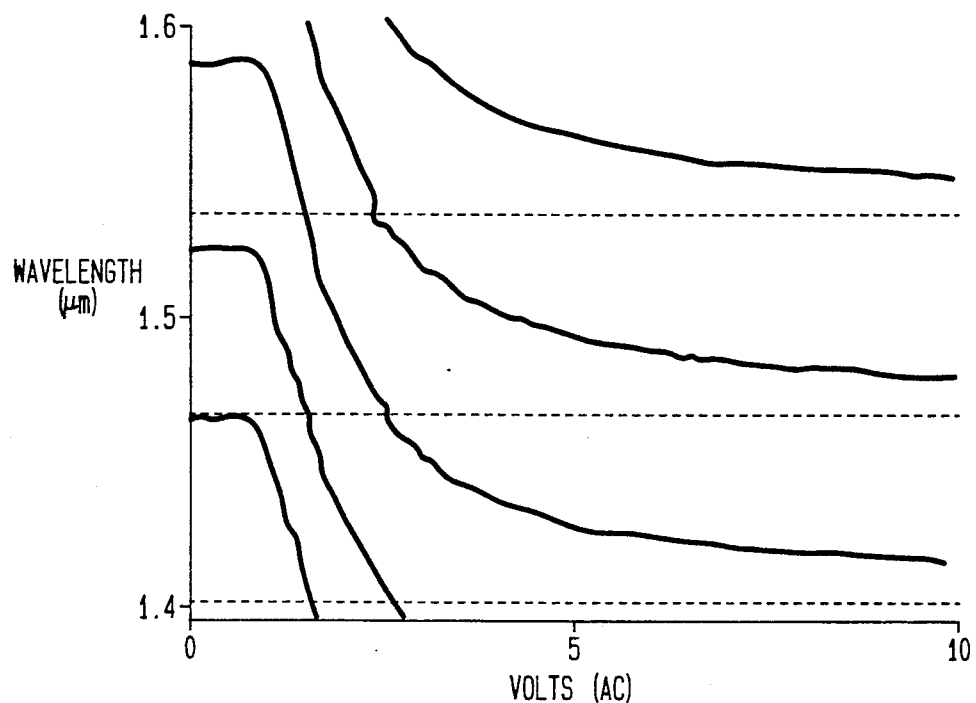
FIG. 3 is a graph illustrating the bias dependence of the transmission peaks of the filter of FIG. 1.

The tunability of the filter of FIG. 1 is demonstrated by the bias dependence of the peaks' wavelengths, as illustrated in the graph of FIG. 3. The dashed lines represent the transmission of light having a polarization along the short axes of the liquid-crystal molecules 28. There is virtually no tunability of these peaks, and thus this polarization cannot be tunably filtered. The solid lines represent the transmission of light having a polarization along the long axes of the liquid-crystal molecules 28. There is a threshold below which no wavelength shift is observed. This plateau is due to the Freedricks effect and has been observed by Saunders et al. as well. It exists when the directors at both surfaces are parallel to the surfaces. It is possible to eliminate this threshold and control its characteristics by changing the surface tilt of the molecules. For example, no threshold would be exhibited in a hybrid aligned sample in which the liquid-crystal molecules at one of the surfaces lie parallel to the surface and those at the other lie perpendicular. Perpendicular orientation can be achieved by the use of a homeotropic alignment agent, such as, octadecyltriethoxysilane. For such a structure in the low voltage regime, the index will change almost linearly with the applied field.

The tunable operation of the filter can be understood from FIG. 3. If the bias voltage is varied between approximately 1.6 V and 2.6 V, a single transmission peak varies between about 1.528 μm and 1.472 μm without interference from any other peaks, a tunability of 56 nm. To obtain tunability over the range of 1.592 μm to 1.532 μm would require removing the peak at 1.537 μm with the polarizer 40. These tuning ranges can be shifted and widened with optimization of the design.

A calculated transmission spectrum has been fit to the transmission data of FIG. 2. For the zero electric field, the ordinary refractive index is $n_o = 1.5$ and the extraordinary refractive index is $n_e = 1.7$. On the other hand, for the 4 V applied across 11.32 μm, $n_o = 1.5$ and $n_e^{eff}(E) = 1.536$, where $n_e^{eff}$ is the effective refractive index.

The power required to operate the filter has been estimated to be in the microwatt range. The switching speed is of the order of milliseconds.

A filter of the present invention has been used in the demonstration of the polarization-scrambler invention disclosed by Maeda in commonly assigned U.S. patent application, Ser. No. 07/583,786, filed Sep. 14, 1990.

The liquid-crystal etalon filter of FIG. 1 is not laterally patterned, but the invention is not so limited.

Figure 4:
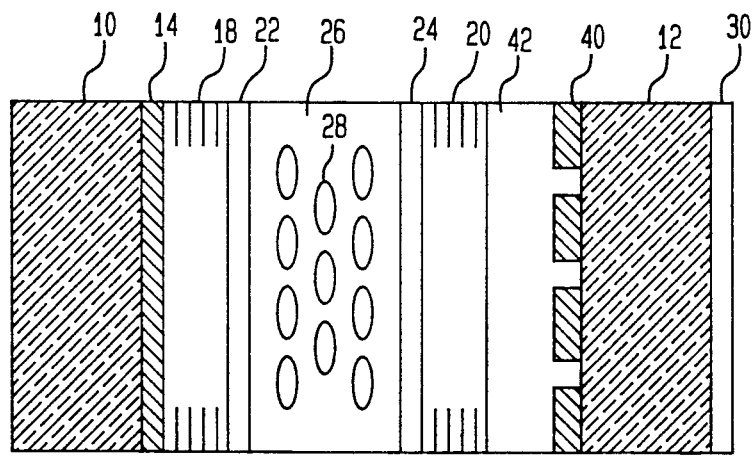
FIG. 4 is a cross-section of a second embodiment.

Illustrated in FIG. 4 is a second embodiment of a liquid-crystal etalon 1-dimensional or 2-dimensional filter array. It differs from the filter of FIG. 1 in that at least one of the electrodes is patterned into pixels 40 which extend across the substrate 12. The pixels 40 can be individually contacted at the side of the filter structure. If the associated dielectric stack 20 is deposited on the electrode pixels 40, a planarizing layer 42 must first be deposited to insure the optical flatness of that mirror stack 20.

Figure 5:
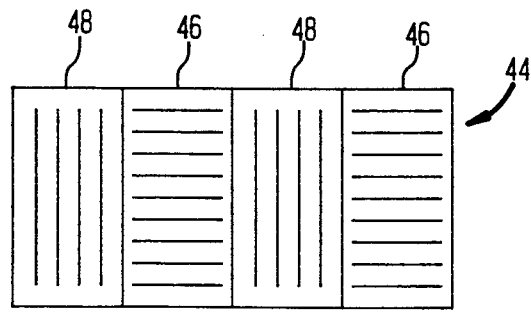
FIG. 5 is a plan view of the alignment layer of a third embodiment.

In a third embodiment, at least one of the alignment layers 22 and 24 is patterned. The aligning procedure described by Patel et al. involves depositing a nylon aligning material on the substrate and then rubbing the aligning material in the direction in which the liquid-crystal molecules are to be oriented. Illustrated in FIG. 5 is a plan view of an alignment layer 44 having first portions 46 rubbed in a first direction and second portions 48 rubbed in a different direction, preferably orthogonal to the first direction. The differential rubbing is easily accomplished for the aligning materials, such as nylon and 1,4 polybutyleneterephthalate. The entire alignment layer 44 is rubbed in a given direction, say the first direction, so that the first portions 46 are given the correct alignment. Then, the entire structure is covered with photoresist and processed using standard lithographic techniques so as to keep the first portions 46 coated with a photoresist material. The exposed second portions 48 are then rubbed in the second direction with the photoresist protecting the already rubbed first portions 46. Removal of the photoresist does not affect the alignment of rubbed first and second portions 46 and 48.

The second alignment layer 22 or 24 can be made to have the same patterned alignments as the patterned alignment layer 44. When the two structures are then assembled, the alignment directions of the opposed portions are made parallel. This requires precise physical alignment of the two alignment layers 22 and 24. Alternatively, the second alignment layer can be made to uniformly induce a perpendicular orientation of the liquid crystals, that is, along the normal of the alignment layer. A homeotropic aligning agent, described previously, will provide this effect. No patterning of the homeotropic aligning agent is required.

The embodiment of FIG. 5 advantageously provides a polarization independent tunable filter for a single-mode optical fiber 50. The filter is assumed to be designed to place the untunable passbands (dashed lines of FIG. 3) outside the desired wavelength tuning range. A graded-index lens 52 on the output of the fiber 50 is aligned to the boundary between paired first and second portions 46 and 48 so that each portion 46 and 48 receives half the light intensity. One portion 46 or 48 blocks a first light polarization but tunably passes a second polarization. Likewise, the other portion 48 or 46 blocks the second light polarization but tunably passes the first polarization. A single direct photodetector detects the intensity of light passed by both portions. Alternatively, the two frequency-filtered polarizations can be recombined by a graded-index lens onto a second single-mode optical fiber. The intensity passed through both portions 46 and 48 is independent of the polarization of the light. A 3 dB loss is incurred by this polarization diversity technique.

The filter of the invention can be used as a short optical pulse generator. A narrow-band light source 32, such as a laser, irradiates the tunable liquid-crystal etalon filter with monochromatic CW light of wavelength λ. The filter of, for example, FIG. 1 is designed to have at least a limited tuning range extending from one side of λ to the other. The bandwidth of the light source 32 should preferably be less than the width of the transmission peak of the filter. To generate the light pulse, a step function DC bias is applied by the voltage generator 29 to the electrodes so as to cover the limited tuning range about λ. Only in the short but finite time required for the finite-width transmission peak to transit λ will the filter transmit the narrow-band light.

The liquid-crystal etalon optical filter of the invention provides for a narrow pass band with wide electrical tunability. It is low-powered, economical to fabricate, and rugged.

What is claimed is:
1. A tunable optical filter, comprising:
   two interference mirrors, each having reflectivity of at least approximately 95%;
   a liquid crystal disposed between said interference mirrors; and
   two electrodes for changing a refractive index of said liquid crystal.
2. A filter as recited in claim 1, wherein said two interference mirrors comprise a stack of alternating layers of differing dielectric constants.
3. A filter as recited in claim 2, further comprising two alignment layers disposed between said liquid crystal and respective ones of said interference mirrors for orienting molecules of portions of said liquid crystal adjacent to said alignment layers.

4. A filter as recited in claim 3, wherein said alignment layers orient said molecules in a common substantially parallel direction.

5. A filter as recited in claim 4, wherein a first one of said alignment layers orients said oriented molecules to be parallel to said first alignment layer and a second one of said alignment layers orients said oriented molecules to be substantially perpendicular to said second alignment layer.

6. A tunable optical filter, comprising:
two interference mirrors, each comprising a stack of alternating layers of differing dielectric constants;
a liquid crystal disposed between said interference mirrors;
two alignment layers disposed between said liquid crystal and respective ones of said interference mirrors for orienting molecules of portions of said liquid crystal adjacent to said alignment layers, wherein at least a first one of said alignment layers has a first portion orienting said molecules in a first direction and a second portion orienting said molecules in a second direction non-parallel to said first direction; and
two electrodes for changing a refractive index of said liquid crystal.

7. A filter as recited in claim 6, wherein said first and second directions are substantially orthogonal directions parallel to a surface of said first one of said alignment layers.

8. A filter as recited in claim 7, wherein a second one of said alignment layers orients said molecules in a direction substantially perpendicular to a surface of said second one of said alignment layers.

9. A filter as recited in claim 1, wherein said two electrodes are disposed on opposite sides of said liquid crystal.

10. An optical pulse generator, comprising:
an optical liquid-crystal etalon filter having tuning electrodes and two end mirrors, each of reflectivity greater than 95%, a band pass of said filter being tunable between a first wavelength and a second wavelength by a variable voltage applied to said tuning electrodes; and
a source of light irradiating said filter and having an emission wavelength between said first and second wavelengths and having an emission bandwidth considerably less than a difference between said first and second wavelengths.

11. A pulse generator as recited in claim 10, further comprising a variable voltage source producing said variable voltage, wherein said variable voltage source causes said band pass of said filter to continuously vary between said first and second wavelengths while said light of said emission wavelength irradiates said filter.

12. A pulse generator as recited in claim 11, wherein said variable voltage source outputs a substantially step-function voltage.

13. A pulse generator as recited in claim 10, wherein said optical etalon filter comprises:
a liquid crystal; and
wherein said two end mirrors comprise two interference mirrors sandwiching said liquid crystal.

14. A dual-polarization liquid-crystal etalon filter, comprising:
a first substrate having formed thereon a first mirror, a first electrode, and a first alignment layer, said first alignment layer comprising a homogeneous aligning agent and being divided into first and second portions separated by an interface, said first portion aligning an adjacent liquid crystal in a first direction substantially parallel to a surface of said first portion, said second portion aligning an adjacent liquid crystal in a second direction substantially parallel to a surface of said second portion and substantially perpendicular to said first direction;
a second substrate having formed thereon a second mirror, a second electrode, and a second alignment layer for aligning an adjacent liquid crystal in one or more predetermined directions, said first and second substrates being assembled together with said first and second alignment layers facing each other and with a predetermined gap therebetween; and
a liquid crystal filling said gap.

15. A filter as recited in claim 14, wherein said mirrors comprise interference mirrors.

16. A filter as recited in claim 14, wherein said liquid crystal is a nematic liquid crystal.

17. A filter as recited in claim 14, wherein said second alignment layer comprises a homeotropic alignment agent for aligning said liquid crystal in a third direction substantially perpendicular to a surface of said second alignment layer.

18. A filter as recited in claim 14, wherein said second alignment layer comprises a homogeneous alignment agent and is divided into third and fourth portions disposed in correspondence to said first and second portions when said substrates are assembled, said third and fourth portions respectively aligning an adjacent liquid crystal in substantially perpendicular directions.

* * * * *